United States Patent [19]

Maruoka

[11] Patent Number: 5,165,324
[45] Date of Patent: Nov. 24, 1992

[54] PISTON-CYLINDER TYPE AIR DAMPER

[75] Inventor: Hiroyuki Maruoka, Toyota, Japan

[73] Assignee: Nifco Inc., Yokohama, Japan

[21] Appl. No.: 777,044

[22] Filed: Oct. 16, 1991

[30] Foreign Application Priority Data

Oct. 16, 1990 [JP] Japan .................. 2-107625

[51] Int. Cl.[5] .......................... F01B 11/02; F16J 10/00
[52] U.S. Cl. ................................ 92/171.1; 92/169.1; 403/372; 285/321
[58] Field of Search ................. 92/169.1, 170.1, 171.1, 92/65 R; 188/322.17; 403/365, 372, 225, 226; 285/321

[56] References Cited

U.S. PATENT DOCUMENTS

| | | | |
|---|---|---|---|
| 3,040,712 | 6/1962 | Harrah | 92/170.1 |
| 3,071,800 | 1/1963 | Patriquin | 92/165 R |
| 3,955,479 | 5/1976 | McLuckie | 92/171.1 X |
| 4,532,856 | 8/1985 | Taylor | 92/170.1 X |
| 4,856,625 | 8/1989 | Oshida | 188/322.17 X |
| 5,050,911 | 9/1991 | Morrison | 285/321 X |

FOREIGN PATENT DOCUMENTS 2-58137  4/1990  Japan .

Primary Examiner—Edward K. Look
Assistant Examiner—Hoang Nguyen
Attorney, Agent, or Firm—Schwartz & Weinrieb

[57] ABSTRACT

A piston-cylinder type air damper includes a cylinder having an open end and a closed end, a piston having a head slidable along and in contact with the inner wall of the cylinder and a rod extending axially from the head and projecting outwardly from the open end of the cylinder, and a cap fitted upon the open end of the cylinder and permitting the rod to centrally penetrate therethrough. The cap is molded from a soft material into a C-shaped cylinder having a slit and two outwardly projecting claws formed upon the outer periphery thereof within the vicinity of the opposite ends thereof which define the slit therebetween. The cylinder has a hole formed within a side wall portion thereof at the open end thereof for engaging the two claws of the cap therein.

4 Claims, 1 Drawing Sheet

FIG.1
FIG.2
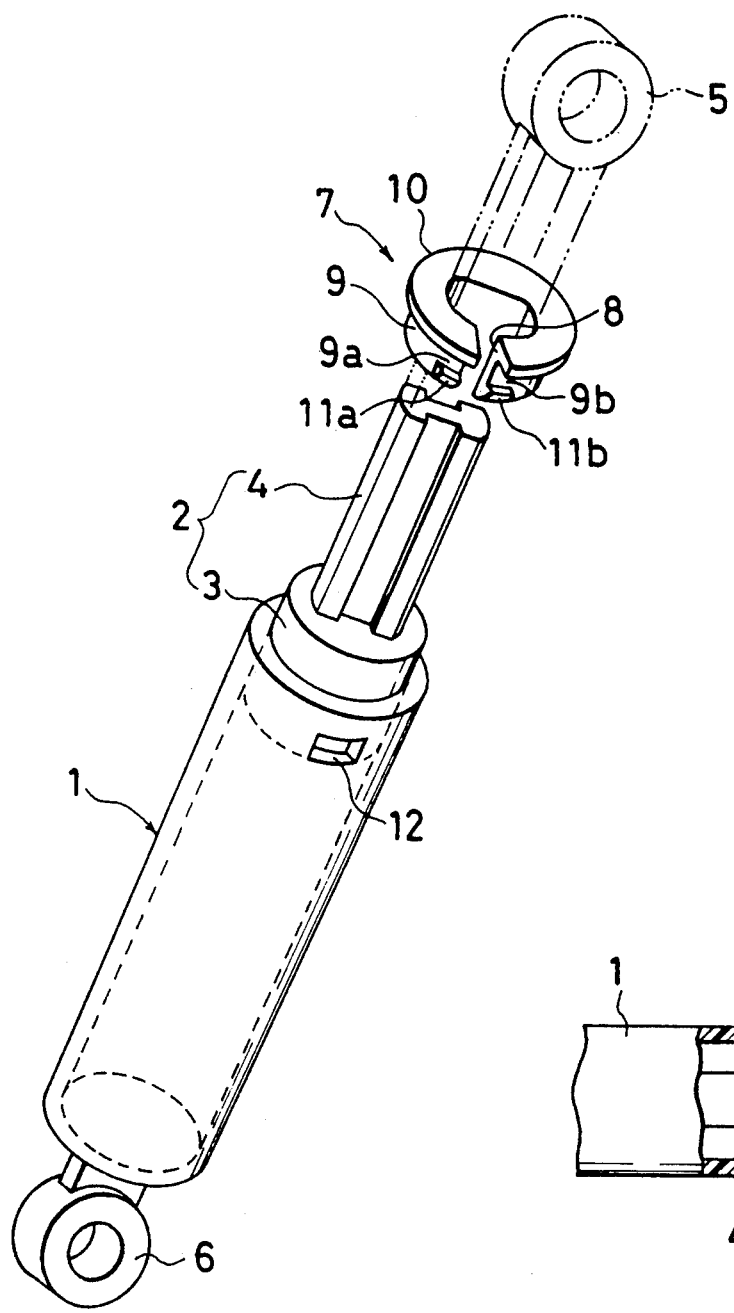
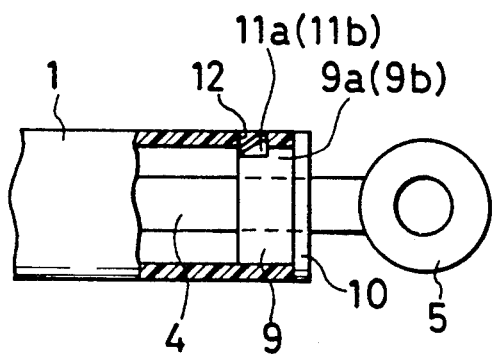

PISTON-CYLINDER TYPE AIR DAMPER

BACKGROUND OF THE INVENTION

1. Field of the Invention:

The present invention relates generally to damper mechanisms, and more particularly to a piston-cylinder type air damper for damping the downward movement of, for example, an automobile glove compartment door which rotates about a pivot so as to open the glove compartment gently.

2. Description of the Prior Art:

Japanese Utility Model Public Disclosure No. 2-58137, for example, discloses a piston-cylinder type air damper comprising a cylinder having an open end and a closed end, a piston having a head slidably disposed in contact with the inner wall of the cylinder, a piston rod extending axially from the piston head and outwardly from the open end of the cylinder, and a cap fitted upon the open end of the cylinder and permitting the piston rod to penetrate therethrough.

In the prior art air damper, the piston head is provided with a two-way vent valve, the closed end of the cylinder is connected to a structural member of the passenger compartment, and the end of the piston rod disposed opposite to the piston head is connected to the glove compartment door. With this arrangement, when the piston head is caused to slide within the cylinder toward the open end thereof for the purpose of opening the glove compartment door, the air passing through the vent valve is controlled by means of the vent valve so as to damp the opening movement of the glove compartment door. Conversely, when the piston head is slidably moved within the cylinder toward the closed end thereof for closing the glove compartment door, the air is allowed to freely pass through the two-way vent valve so as to facilitate the closing movement of the glove compartment. The cap for closing the open end of the cylinder of the prior art air damper is molded from a suitable hard synthetic resin such as, for example, POM (polyoxymethylene), is provided at the center thereof with a guide hole which has a sectional profile slightly larger than that of the piston rod, and thereby permits the piston rod to penetrate therethrough so as to guide the sliding movement of the piston. For this reason, peripheral portions of the piston rod collide against the edge of the guide hole during operation of the automobile and produce a rattling sound. In order to prevent this rattling noise, it is necessary to attach a felt piece to the cap with suitable adhesive or tape so that the piston rod will collide against the felt piece. This attaching step is troublesome and increases the number of steps required for assembling the damper.

OBJECT OF THE INVENTION

The main object of the present invention is to provide a piston-cylinder type air damper which is easy to assemble and capable of preventing the occurrence of rattling.

SUMMARY OF THE INVENTION

In order to attain the above object, according to the present invention there is provided a piston-cylinder type air damper comprising a cylinder having an open end and a closed end, a piston having a head which is disposed in slidable contact with an inner wall of the cylinder and a rod extending axially from the head and outwardly from the open end of the cylinder, and a cap fitted upon the open end of the cylinder and permitting the rod to penetrate axially therethrough, the cap being molded from a soft material into a C-shaped cylinder having a slit and two outwardly projecting claws formed upon outer peripheral portions of the cap within the vicinity of the opposite ends thereof defining the slit therebetween, the cylinder having a hole formed therein within the vicinity of the open end thereof for engaging the two claws of the cap therein.

BRIEF DESCRIPTION OF THE DRAWINGS

The above and other objects, characteristic features and advantages of the present invention will become more apparent from the following description of the invention with reference to the accompanying drawings, in which like reference characters designate like or corresponding parts throughout the several views, and wherein:

FIG. 1 is an exploded perspective view illustrating one embodiment of the piston-cylinder type air damper constructed according to the present invention.

FIG. 2 is a sectional view illustrating the principal part of the piston-cylinder type air damper in an assembled state.

DETAILED DESCRIPTION OF THE PREFERRED EMBODIMENT

The present invention will now be described with reference to the illustrated embodiment.

In FIG. 1, reference numeral 1 designates a cylinder having an open end and a closed end, and numeral 2 designates a piston. The cylinder and piston are molded from a plastic material. The piston 2 has a head 3 slidable along and in contact with the inner wall of the cylinder 1 and a rod 4 extending axially from the piston head 3 and projecting outwardly from the open end of the cylinder 1. The piston head 3 is provided therein with a two-way vent valve (not shown). The piston rod 4 has a substantially rectangular sectional profile and is provided at the end opposite to the piston head 3 with a ring portion 5 for connection to a glove compartment door, for example. The closed end of the cylinder 1 is provided with another ring portion 6 for connection to a structural member of a passenger compartment, for example.

Denoted by means of reference numeral 7 is a cap which is molded from a soft material such as, for example, an elastmer into a C-shaped cylinder for permitting passage of that portion of the piston rod 4 defined between the piston head 3 and the ring portion 5 through the center thereof and having a slit 8 defined between the opposite end portions 9a and 9b thereof. The piston rod 4 is inserted into the cap 7, with the slit 8 enlarged. When the opposite end portions 9a and 9b are brought into contact with each other so as to close the slit 8 against as a result of the elasticity of the material of the cap 7, a barrel portion 9 of the cap 7 assumes a circular outer configuration which is snugly disposable interiorly within the inner wall of the cylinder 1 at the open end thereof, whereas the inner shape peripheral configuration of the barrel portion 9 corresponds to the sectional profile of the piston rod 4. The cap 7 is provided at one end thereof with a flange 10 which extends from the outer periphery of the barrel portion 9 and, when the barrel portion 9 is disposed within the cylinder 1 through the open end thereof, the flange 10 comes into contact with the open end face of the cylinder 1.

The barrel portion 9 has two outwardly projecting saw-toothed claws 11a and 11b formed upon its outer periphery in the vicinity of the opposite end portions 9a and 9b thereof, and the cylinder 1 has a claw-receiving hole 12 formed within a side portion thereof within the vicinity of the open end for receiving and engaging therein the two saw-toothed claws 11a and 11b which are brought into contact with each other by closing the slit 8, whereby the cap 7 is lockingly or securely retained interiorly of the inner wall of the cylinder 1 at the open end of the cylinder 1.

The piston head 3 is inserted into the cylinder 1 through the open end thereof. The piston rod 4 projecting from the open end of the cylinder 1 is then inserted into the cap 7 by extending the slit 8. Subsequently, the cap 7 is inserted through the open end into the cylinder 1 with the saw-toothed claws 11a and 11b of the cap 7 aligned with the claw-receiving hole 12 of the cylinder 1 and with the slit 8 closed. At this time, the claws 11a and 11b elastically deform from their thin distal ends as they enter the cylinder 1. Then, when the flange 10 of the cap 7 abuts upon the open end face of the cylinder 1, they snap-engage within the hole 12 of the cylinder 1. Thus, the cap 7 is retained interiorly of the inside wall of the cylinder at the open end of the cylinder 1, thereby completing the assembly of the piston-cylinder type air damper as illustrated in FIG. 2.

According to the present invention, as described above, since the piston rod is snugly fitted within the cap molded from a soft material such as, for example, an elastomer, no rattling occurs during running of the automobile. Furthermore, since the cap is retained upon the inner wall of the cylinder 1 at the open end of the cylinder with the saw-toothed claws engaged with the claw-receiving hole, the opposite end portions of the cap will not open even during the extracting stroke of the piston, thereby preventing the cap from falling off the cylinder as might otherwise happen due to its soft material. Moreover, since the conventional step of felt attachment is eliminated, the assembling operation becomes easy and the operating assembly time is shortened.

Obviously, many modifications and variations of the present invention are possible in light of the above teachings. It is therefore to be understood that within the scope of the appended claims, the present invention may be practiced otherwise than as specifically described herein.

What is claimed is:

1. A piston-cylinder type air damper, comprising:
    a cylinder having an open end and a closed end;
    a piston having a head slidable along and in contact with an inner wall of said cylinder, and a rod extending axially from said head and projecting outwardly from said open end of said cylinder; and
    a cap disposed within said open end of said cylinder and permitting said piston rod to centrally penetrate therethrough, said cap being molded from a soft material and comprising a C-shaped cylinder having a slit defined between opposite arcuate end portions thereof which are expansible in opposite directions with respect to each other within the vicinity of said slit so as to permit said piston rod to be inserted therethrough, and two outwardly projecting claws formed upon outer peripheral portions of said cap within the vicinity of said opposite ends thereof which define said slit therebetween;
    said cylinder having a hole formed therein near said open end thereof for accommodating said two claws of said cap therein.

2. A piston-cylinder type air damper according to claim 1, wherein said soft material is an elastomer.

3. A piston-cylinder type air damper according to claim 1, wherein said rod is provided at one end thereof with a ring portion for connection to an automobile glove compartment door and the closed end of said cylinder is provided with another ring portion for connection to a structural member of a passenger compartment of the automobile.

4. A piston-cylinder type air damper as set forth in claim 1, wherein:
    said cylinder comprises an annular end wall surface defining said open end of said cylinder; and
    said cap comprises an axially extending cylindrical barrel portion disposed within said open end of said cylinder, and a radially extending flange portion integral with an axially outer end portion of said barrel portion for abutting against said annular end wall surface of said cylinder when said cap is fully seated within said open end of said cylinder.

* * * * *